(12) United States Patent
Schönleber et al.

(10) Patent No.: US 6,790,536 B2
(45) Date of Patent: Sep. 14, 2004

(54) SHEET METAL PROFILE SUPPORT, IN PARTICULAR FOR AUTOMOTIVE CONSTRUCTION, AND METHOD FOR PRODUCING IT

(75) Inventors: Gerhard Schönleber, Dillenburg (DE); Alexander Dollischek, Herdorf (DE)

(73) Assignee: Linde + Pullman AG, Zurich-Zollikon (CH)

( * ) Notice: Subject to any disclaimer, the term of this patent is extended or adjusted under 35 U.S.C. 154(b) by 64 days.

(21) Appl. No.: 10/214,863

(22) Filed: Aug. 9, 2002

(65) Prior Publication Data

US 2003/0044632 A1 Mar. 6, 2003

(30) Foreign Application Priority Data

Aug. 11, 2001 (DE) .......................................... 101 39 661

(51) Int. Cl.[7] .............................. F16S 3/00; B62D 27/02; C09J 5/00
(52) U.S. Cl. .................. 428/595; 428/599; 428/586; 428/582; 428/603; 29/469.5; 29/521; 72/368; 72/379.2; 52/735.1
(58) Field of Search ................................ 428/595, 599, 428/586, 582, 598, 603; 52/729.5, 733.2, 736.1, 735.1; 29/521, 469.5; 72/379.2, 368

(56) References Cited

U.S. PATENT DOCUMENTS

| 3,568,383 A | * | 3/1971 | Judkins et al. ................. 52/210 |
| 4,180,179 A | * | 12/1979 | Hoenig et al. ................ 220/783 |
| 5,443,244 A | * | 8/1995 | Gibbs ........................... 256/22 |
| 5,958,603 A | * | 9/1999 | Ragland et al. ............. 428/595 |

FOREIGN PATENT DOCUMENTS

| DE | 2437296 | * | 2/1976 |
| DE | 3103736 | * | 8/1982 |
| DE | 3418691 A1 | | 2/1986 |
| DE | 4416231 A1 | | 11/1995 |
| DE | 19730560 A1 | | 2/1999 |
| DE | 19748786 A1 | | 10/1999 |
| DE | 19911282 A1 | | 9/2000 |

* cited by examiner

Primary Examiner—John J. Zimmerman
(74) Attorney, Agent, or Firm—Charles P. Boukus, Jr.

(57) ABSTRACT

A sheet metal profile support (10) for automotive construction, such as a cross member, rocker panel, or frame support is disclosed, with a U-shaped, parabolic, or horseshoe-shaped profile cross section (12), in which, in at least one section (14) of the two legs (16, 18) of the profile, a first and second sheet metal layer (20, 22) rest flush against each other as a sheet doubling and in the region of the free ends of the legs (16, 18), the sheet metal layers (20, 22) are connected to each other in one piece by means of a beaded edge (32) that has a hollow chamber (34). In order to improve the torsional rigidity and damping and to extend the service life, the hollow chamber (34) of the beaded edge (32) in the region of the free ends of the legs (16, 18) is preferably completely filled with glue (24) and the glue (24) is introduced between the sheet metal layers (20, 22), at least in the section (14) of the flush-contacting sheet doubling in the region of the legs of the profile, and the sheet metal layers (20, 22) are bonded to each other by means of the glue (24), in particular by means of a glue layer (26). In addition, a method for producing a sheet metal profile support of this kind is disclosed, which is distinguished by the fact that during the shaping, glue (24) is introduced between the first and second sheet metal layers (20, 22) at a time when the sheet metal layers (20, 22), in the section (14) that will form the flush sheet doubling later in the shaping process, are disposed approximately in a V-shape (48) in relation to each other (FIG. 2).

17 Claims, 5 Drawing Sheets

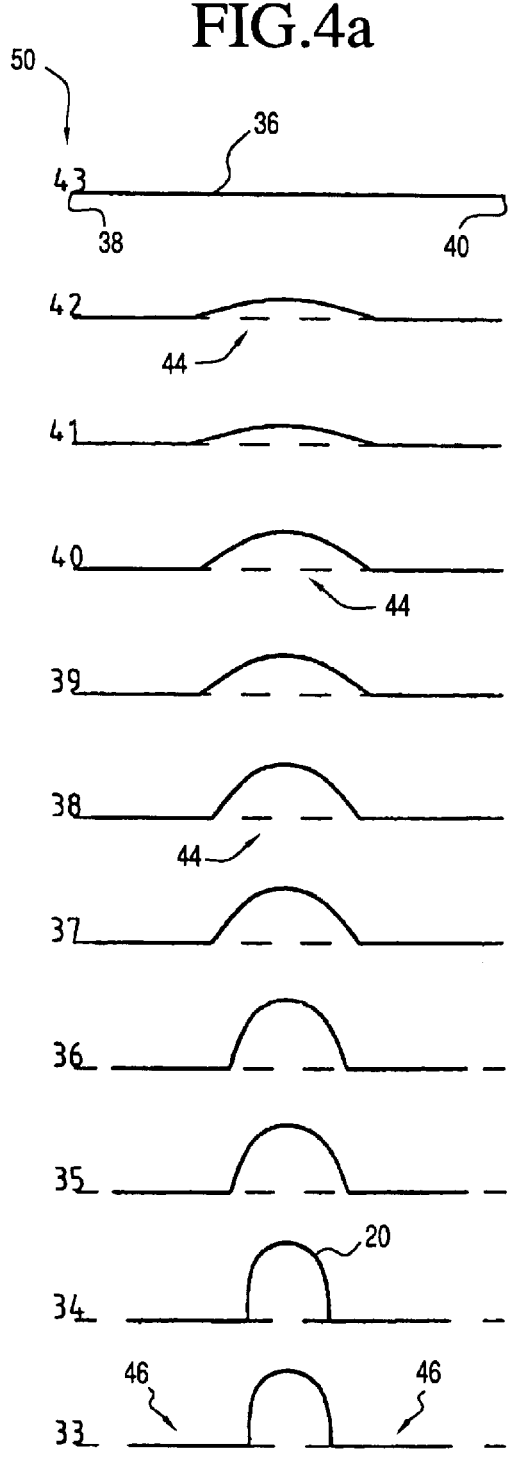
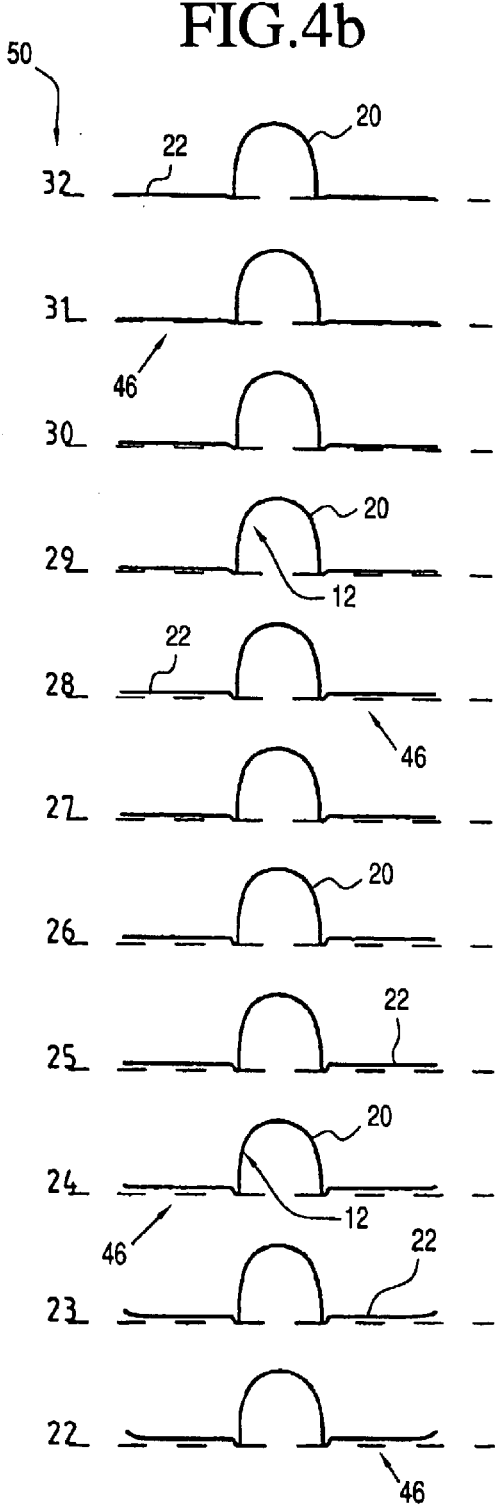
FIG.4a
FIG.4b

SHEET METAL PROFILE SUPPORT, IN PARTICULAR FOR AUTOMOTIVE CONSTRUCTION, AND METHOD FOR PRODUCING IT

FIELD OF THE INVENTION

The invention relates to a sheet metal profile support, in particular for automotive construction, such as a cross member, rocker panel, frame support, or other structural element, with an essentially U-shaped, parabolic, or horseshoe-shaped profile cross section, in which, in at least a section of the two legs of the profile, a first and second sheet metal layer rest essentially flush against each other as a sheet doubling and in the region of the free ends of the legs, the sheet metal layers are connected to each other in one piece by means of a beaded edge that has a hollow chamber.

BACKGROUND OF THE INVENTION

Sheet metal profile supports of this kind, which have a U-shaped cross section and sheet doublings, are known, for example, from DE 199 11 282 A2 and are used, for example, as cross members in motor vehicles However, they have the disadvantage of an insufficient torsional rigidity The insufficient torsional rigidity of such sheet metal profile supports also results in a gap formation in the region of the sheet doubling where the sheet metal layers rest flush against each other in the untwisted state. The result is that, for example due to the penetration of moisture into the gap produced by the torsional forces in the region of the sheet doubling, increased corrosion of the sheet metal profile support occurs and the service life of the sheet metal profile support decreases considerably.

Various methods of gluing sheet metal parts are already known from DE 44 16 231 A1, DE 197 30 560 A1, and DE 197 48 786 C2, but these are concerned with bonding multi-part sheet metal components and describe a glued connection along a seam between two components or a gluing of two metal bands.

DE 34 18 691 A1 has disclosed a sheet metal profile support with a U-shaped profile cross section in which, in a section of the two legs of the profile, a first and second sheet metal layer are provided as a sheet doubling and the sheet metal layers are bonded to each other with glue. The hollow body is comprised of relatively thin sheet metal and is provided with a reinforcement. The outer skin is comprised of at least two sheets glued to each other, where the glue joints are possibly embodied in the form of islands and are arranged in such a way that the non-glued area is arrayed in a grid pattern and at least the one sheet has a channeled reinforcing grid that corresponds to this grid pattern. Both the hollow body and the channels are produced by means of a blow molding process that uses compressed fluids. According to FIG. 3 of DE 34 18 691 A1, two sheet metal layers, which are each comprised of two previously glued sheets, are placed one on top of the other and the two inner sheets are connected to each other in a sealed fashion in a circumferential region. Then the two glued double-sheet layers are shaped by means of hydroforming and are pressed against the inner walls of the cavity. In another process step, likewise by means of hydroforming, the inner sheet of each double-sheet layer is shaped in the unglued regions to produce longitudinal channels and lateral channels in the form of a reinforcing grid.

SUMMARY OF THE INVENTION

By contrast, the object of the current invention is to modify a sheet metal profile support with the features mentioned at the beginning so that both torsional rigidity and damping are improved and the service life is extended.

This object is attained in the sheet metal profile support with the features mentioned at the beginning essentially by virtue of the fact that the hollow chamber of the beaded edge in the region of the free ends of the legs is preferably completely filled with glue and that the glue is introduced between the sheet metal layers, at least in the section of the flush-contacting sheet doubling in the region of the legs of the profile, and the sheet metal layers are bonded to each other by means of the glue, in particular by means of a glue layer.

On the one hand, this measure of gluing the two sheet metal layers over essentially their entire area in the region of the sheet doubling of the two legs achieves a firm bond between the two sheet metal layers and therefore an improved torsional rigidity and damping. On the other hand, this measure prevents torsional forces from causing the two sheet metal layers, which rest essentially flush against each other in the region of the legs, to lift up from one another and form a gap, since the two sheet metal layers in the region of the legs are essentially bonded to each other over their entire area by means of a glue layer. When corrosion forces are at work, this measure counteracts a gap action in the region of the sheet doubling of the legs, thus preventing the penetration of moisture, at least into this region of the sheet metal profile, and thus reliably preventing an increased risk of corrosion.

In the region of the free ends of the legs, the two sheet metal layers are connected to each other in one piece by means of a beaded edge, which further improves the stiffness or torsional rigidity of the sheet metal profile support.

Furthermore it has also turned out to be advantageous that the hollow chambers of the beaded edge in the region of the free ends of the legs are preferably completely filled with glue so that moisture cannot penetrate into the region of the flush sheet doubling of the legs of the sheet metal profile support from these hollow chambers either.

According to a first advantageous embodiment of the invention, a curved or arc-shaped connecting section of the two legs is constituted by the first and second sheet metal layer, but in the region of this connecting section, these layers have different curvatures or bends and consequently form a hollow chamber, which also contributes to improving the torsional rigidity and damping properties. This hollow chamber has a relatively large inner clearance so that incoming moisture can easily drain away or dry out It has turned out to be advantageous that the hollow chamber has an essentially sickle-shaped cross sectional profile and in the region of the sickle-shaped end sections, the two sheet metal layers approach each other in an essentially asymptotic fashion until they come into flush contact.

According to another advantageous embodiment of the invention, the beaded edges have an essentially teardrop-shaped cross sectional profile From a production engineering standpoint, it is also advantageous that the sheet metal profile support is formed, in particular rolled, out of a one-piece sheet and the longitudinal edges of the sheet are bonded to each other, in particular welded, along a butt seam extending in the direction of the longitudinal axis of the sheet metal profile support. The shaping of the essentially flat, one-piece sheet into the sheet metal profile support preferably takes place through a large number of rolling steps or passes and at the end, when the shaping of the sheet metal profile support is completed, the longitudinal edges of the sheet are nondetachably bonded to each other in the region of the butt seam. These measures produce an inexpensive and extremely stable sheet metal profile support.

The butt seam is advantageously disposed in a central section of one of the two sheet metal layers that make up the connecting section of the two legs. The butt seam can be disposed in either the first or the second sheet metal layer, but from a production engineering standpoint, it is preferable for the butt seam to be disposed in the second, outer sheet metal layer, which encompasses the first, inner sheet metal layer It turns out to be a particularly advantageous measure that the glue forms a glue layer, which essentially covers the entire area between the contacting sheet metal layers of the legs, reliably preventing a penetration of moisture in between the sheet metal layers, which rest against each other in an essentially flush manner in the region of the legs.

In addition, it turns out to be extremely advantageous that the glue is disposed at least in sections of the hollow chamber of the connecting section, particularly in the region of the ends of the sickle-shaped cross sectional profile pointing toward the legs. In the region of the leg, in which the sheet metal layers approach each other asymptotically in order to form an essentially flush sheet doubling, this measure permits the glue to produce a seal between the two sheet metal layers so that moisture or water disposed in the sickle-shaped or otherwise profiled hollow chamber cannot penetrate into the sheet doubling in the region of the leg The invention also relates to a method for producing a sheet metal profile support with improved torsional rigidity and extended service life, in which a central region of an essentially flat sheet is shaped into a first sheet metal layer with an essentially U-shaped, parabolic, or horseshoe-shaped profile cross section, and then the edge regions of the sheet are shaped into a second sheet metal layer with an essentially U-shaped, parabolic, or horseshoe-shaped profile cross section, and after the shaping is completed, the second sheet metal layer encompasses or embraces the first sheet metal layer. The method is characterized in that during the shaping, glue is introduced between the first and second sheet metal layers at a time when these sheet metal layers, in the section that will form the flush sheet doubling later in the shaping process, are disposed approximately in a V-shape in relation to each other. This measure allows a delivery device to simply and reliably introduce the glue into the region of the sections of the sheet metal layers that are to be glued. On the whole, this manufacturing method produces a sheet metal profile support with improved torsional rigidity and service life.

In a particularly advantageous embodiment, during the shaping, the glue is introduced into the region of a beaded edge at the free end of the leg of the sheet metal profile support so that the fluid glue can collect in the channel formed by the beaded edge and the adjoining sheet metal layers, which are essentially disposed in a V-shape in relation to each other, and fills this channel to a particular fill level. The glue is consequently reliably contained in this channel in the rolled band that is undergoing the shaping process. The fill level of the channel is established by matching the supply quantity of the glue to the processing speed, i.e. the transport speed of the sheet metal band during the shaping process.

In a particularly advantageous embodiment, such a fill level of the channel or such a volume of supplied glue is adjusted in relation to the processing speed so that as a result of the subsequent shaping of the second sheet metal layer into flush contact with the first sheet metal layer, the glue is pushed or pressed between the two sheet metal layers, at least in the section of the two legs in the region of the sheet doubling, into the connecting section of the legs and into the sickle-shaped hollow chamber, so that the walls of the sheet metal layers in the region of the sheet doubling are wetted over their entire area with glue or are covered with a glue layer.

This assures that the hollow chambers of the beaded edge are essentially completely filled with glue, the side walls of the first and second sheet metal layers that rest against each other in the region of the sheet doubling of the legs are completely covered with glue, and possibly also, a small end section of the sickle-shaped regions of the hollow chambers of the connecting section of the two legs is filled with glue, thus reliably preventing a penetration of moisture into the region of the sheet doubling. This uniform connection of the sheet metal layers over their entire area in the region of the sheet doubling of the legs also produces a homogeneous bond of the sheet metal layers so that a significantly increased torsional rigidity and improved damping of the sheet metal profile support can be achieved.

After the shaping is completed, the longitudinal edges of the sheet are permanently bonded to each other, in particular welded, along the butt seam.

The shaping of the sheet into a double-walled sheet metal profile support preferably occurs over a number of succeeding rolling steps or passes in which the sheet metal band continuously travels through the shaping process and the individual passes, which results in a high and degree of manufacturing precision.

BRIEF DESCRIPTION OF THE DRAWINGS

Other advantages and potential uses of the current invention ensue from the following description of exemplary embodiments in conjunction with the drawings.

FIGS. 4a–4d show the passes 43 to 1 in FIG. 3 in sequential order.

DETAILED DESCRIPTION OF THE INVENTION

Figure 1:
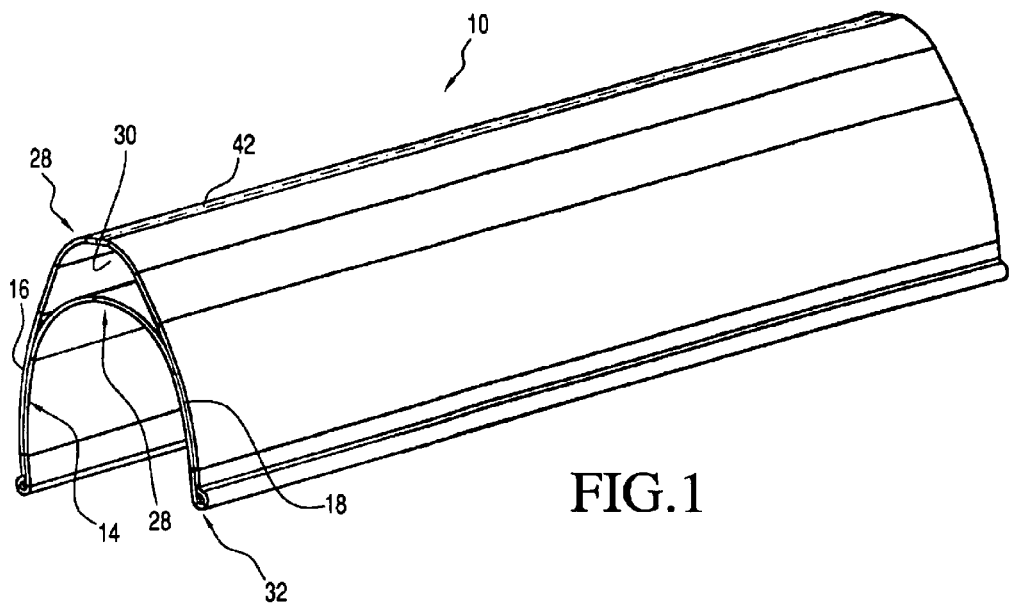
FIG. 1 shows a perspective view of an embodiment of a sheet metal profile support according to the invention.
Figure 2:
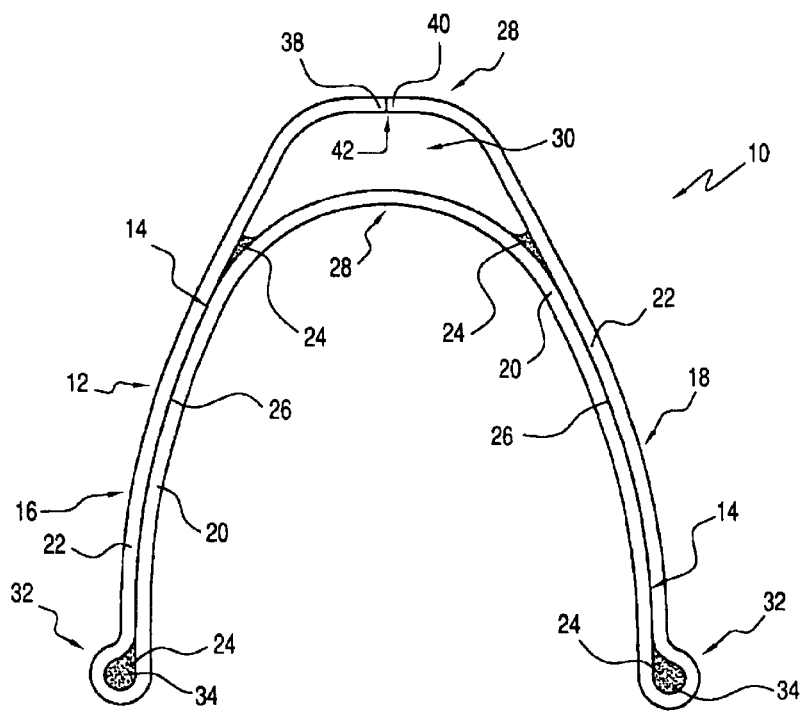
FIG. 2 shows a cross section through the sheet metal profile support in FIG. 1.

The sheet metal profile support 10 shown in FIGS. 1 and 2 is particularly used in automotive construction, for example motor vehicle construction, and can be used as a cross member, rocker panel, frame support, or other structural element. The sheet metal profile support 10 has an essentially U-shaped, parabolic, or horseshoe-shaped profile cross section 12, and in at least one section 14 of the two legs 16, 18 of the profile, a first and second sheet metal layer 20, 22 rest essentially flush against each other as a sheet doubling. A glue 24 is introduced between the sheet metal layers 20, 22, at least in the section 14, so that the sheet metal layers 20, 22 are bonded to each other by means of the glue, in particular by means of a glue layer 26.

A curved or arc-shaped connecting section 28 for connecting the two legs 16 or 18 is also formed by the first and second sheet metal layers 20, 22, which do not rest flush against each other in the region of this connecting section 28, but enclose a hollow chamber 30 between them due to their differing curvatures In this respect, the sheet metal profile support 10 can also be referred to as a double-U-shaped profile in which the first U-shaped profile is contained inside the second U-shaped profile and, in the region of the connecting section 28 that has the hollow chamber 30, the sheet metal layers 20, 22 approach each other asymptotically in pairs to form the legs 16, 18 of the sheet metal profile support 10.

As shown particularly in FIG. 2, the hollow chamber 30 has an essentially sickle-shaped cross sectional profile. In the region of the free ends of the legs 16, 18, the sheet metal layers 20, 22 are connected to each other in one piece by means of a beaded edge 32. In the region of the free end of each of the legs 16, 18, the beaded edge encloses a hollow chamber 34 with an essentially teardrop-shaped cross sectional profile.

The entire sheet metal profile support is formed, in particular rolled, out of a one-piece sheet 36 or a sheet metal band and the longitudinal edges 38, 40 of the sheet (FIG. 4a, pass 50 number 43), are bonded to each other, in particular welded, along a butt seam 42 extending in the direction of the longitudinal axis of the sheet metal profile support 10 The butt seam 42 is disposed in a central section of one of the sheet metal layers 20, 22, in particular the second sheet metal layer 22, of the connecting section 28 of the two legs 16, 18.

As can be inferred in particular from FIG. 2, the glue 24 forms a glue layer 26 that is preferably disposed essentially covering the entire area between the contacting sheet metal layers 20, 22 of the legs 16, 18. In addition, the glue 24 is also disposed in sections of the hollow chamber 30 of the connecting section 28, particularly in the region of the ends of the sickle-shaped cross sectional profile pointing toward the legs 16, 18, in which the sheet metal layers 20, 22 approach each other in essentially asymptotic fashion in order to then rest essentially flush against each other in the region of the sheet doubling. In the exemplary embodiment in FIG. 2, the hollow chambers 34 of the beaded edge 32 in the region of the free ends of the legs 16, 18 are also preferably completely filled with glue 24.

These measures produce not only a highly stable connection of the sheet doubling over the entire area in the region of the legs 16, 18 of the sheet metal profile support 10, with the attendant improved torsional rigidity, but also effectively prevent a penetration of moisture into the region of the material doubling, which is covered with a glue layer 26 essentially over its entire surface; even the adjoining regions of the hollow chambers 30, 34 are partially with filled with glue 24, or else the hollow chambers 30, 34 are completely filled with glue. The torsional rigidity of the sheet metal profile support is increased not only by the gluing of the sheet doubling in the region of the legs 16, 18, but also by the beaded edge 32. This beaded edge 32, however, also serves to prevent an excessive mechanical stress on the sheet metal profile support 10 during production and during the shaping procedures.

The method for producing a sheet metal profile support will be explained in detail in conjunction with FIGS. 3 to 6.

Figure 3:
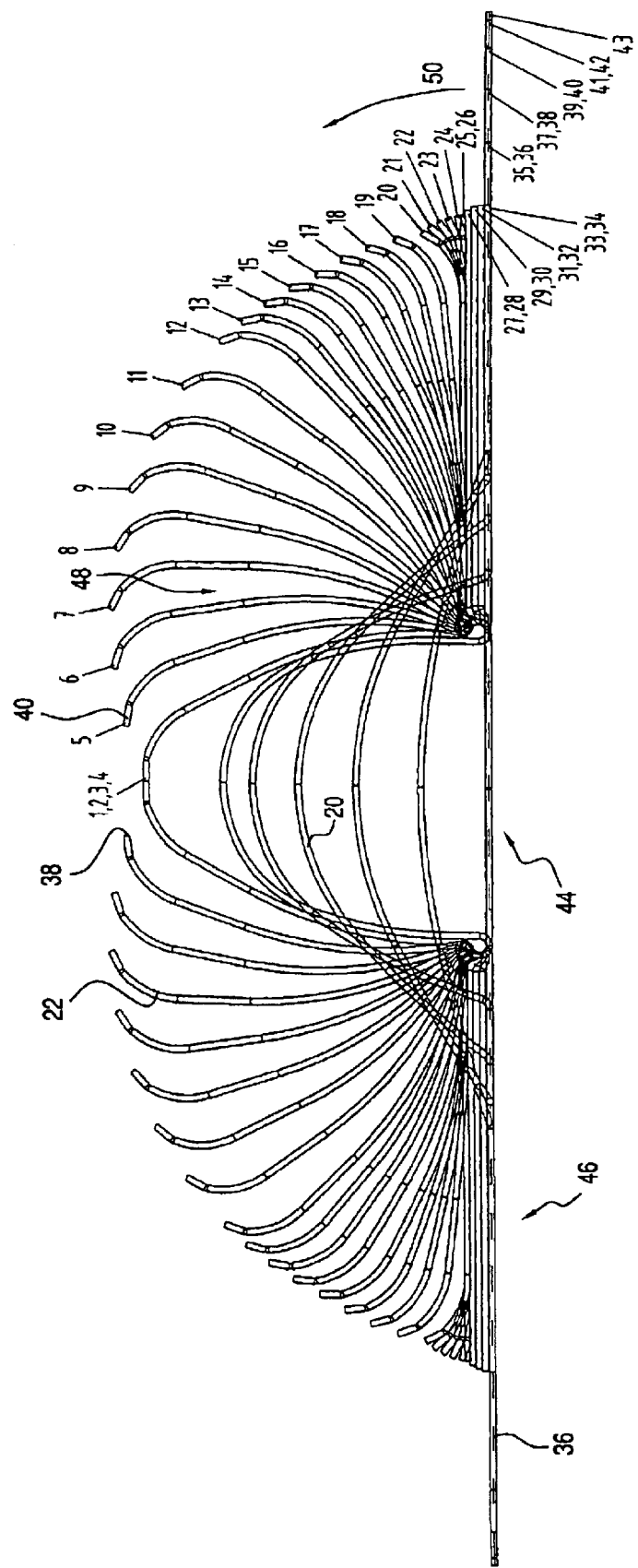
FIG. 3 shows a profile flower design for producing the sheet metal profile support in FIG. 1, with the individual shaping steps or passes 43 to 1.

As can be inferred in particular from FIGS. 3 and 4a to 4d, a central region 44 of an essentially flat sheet 36 or a sheet metal band is shaped into a first sheet metal layer 20 with an essentially U-shaped, parabolic, or horseshoe-shaped profile cross section 12. Then the edge regions 46 of the sheet 36 are shaped into a second sheet metal layer 22 with an essentially U-shaped, parabolic, or horseshoe-shaped profile cross section 12, and after the shaping is completed, the second sheet metal layer 22 encompasses or embraces the first sheet metal layer 20. The individual shaping steps or passes 50 are shown in FIGS. 3 and 4 in the numbering sequence from 43 to 1. For further particulars, reference is hereby made to the details in these graphic depictions.

During the shaping process, glue 24 is introduced between the first and second sheet metal layers 20, 22. It is advantageous to introduce the glue 24 between the first and second sheet metal layers 20, 22 at a time when these sheet metal layers 20, 22, in the section 14 that will form the flush sheet doubling later in the shaping process, are disposed approximately in a V-shape 48 in relation to each other. According to the depiction in FIG. 4c, this can appropriately take place, for example, in one of the passes 50 numbered 10 to 5; in the particular exemplary embodiment, the glue 24 is introduced in pass 7, as shown in the enlarged depiction of pass 7 in FIG. 5. FIG. 6 shows the preceding step 8, in which the glue 24 has not yet been introduced between the first and second sheet metal layers 20, 22

Figure 4C:
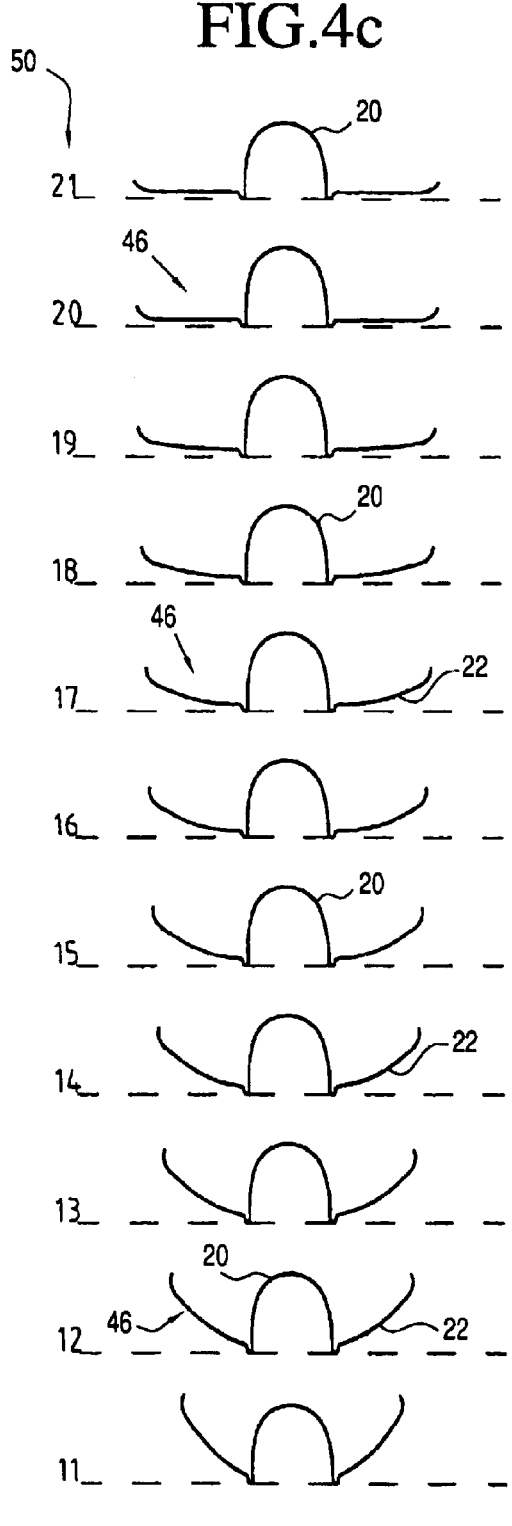
Figure 4D:
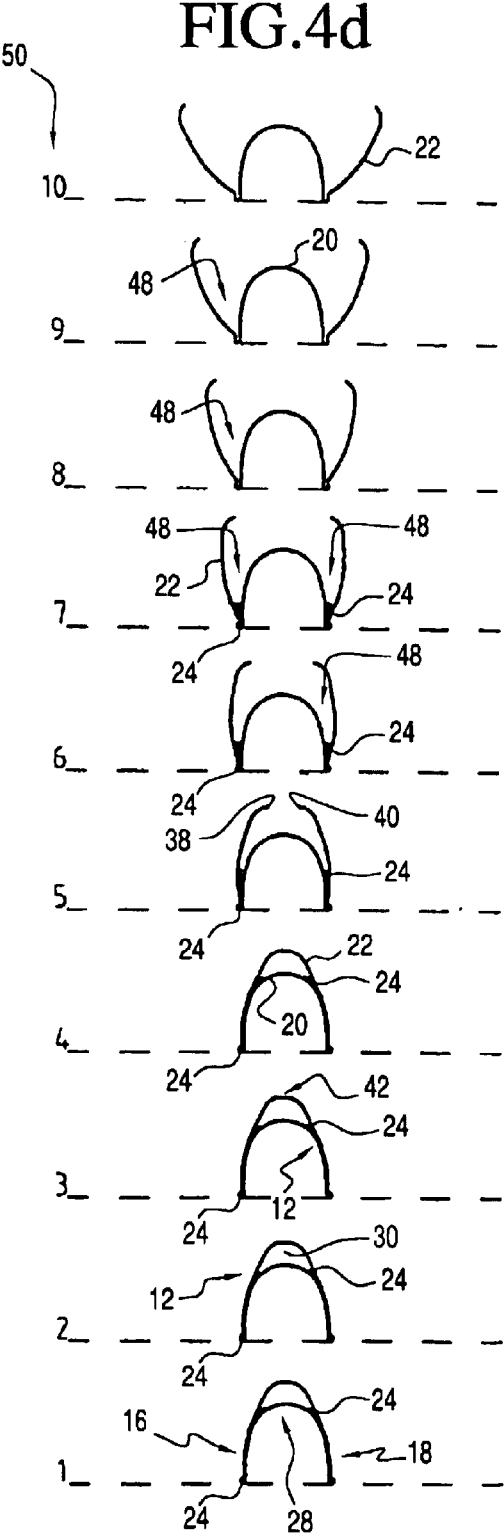
Figure 5:
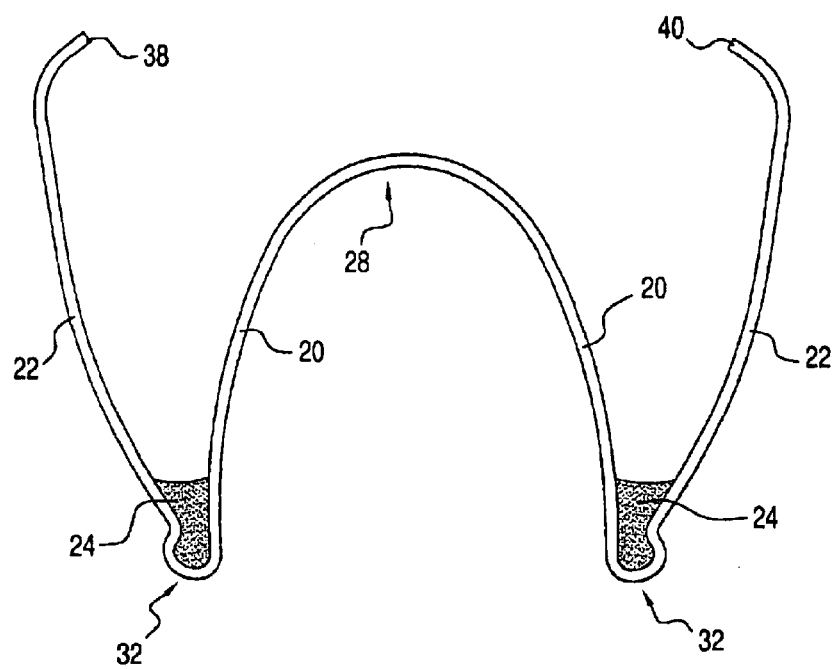
FIG. 5 shows an enlarged depiction of the pass number 7, in which the glue has already been introduced.
Figure 6:
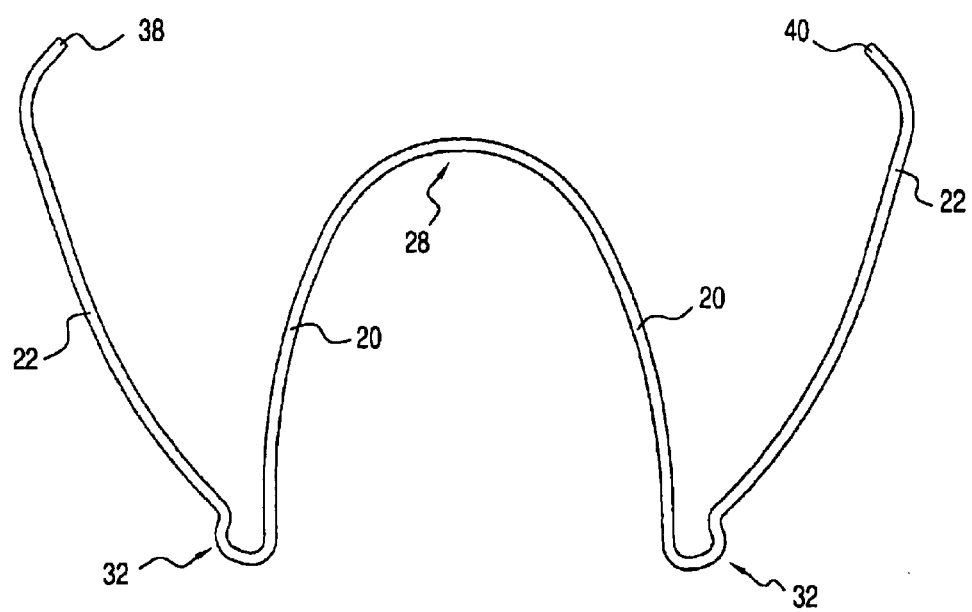
FIG. 6 shows an enlarged depiction of the preceding pass number 8.

As is particularly clear in FIG. 5, during the shaping, the glue 24 is introduced into the region of the beaded edge 32 at the free end of the leg 16, 18 of the sheet metal profile support 10, and the filling quantity or fill level of the glue between the two sheet metal layers 20, 22 is selected so that as a result of the subsequent shaping steps that bring the second sheet metal layer 22 into flush contact with the first sheet metal layer 20—the passes 50 numbered 6 to 1 in the exemplary embodiment in FIG. 4c, the glue 24 is pushed or pressed between the first and second sheet metal layers 20, 22, at least in the section 14 of the two legs 16, 18, into the connecting section 28 of the legs 16, 18 and possibly further into the sickle-shaped hollow chamber 30 in the region of the connecting section 28. Because the spatial volume disposed between the sheet metal layers 20, 22 continuously decreases during the shaping, for example in the range from pass 7 to pass 4, the glue 24 is forced to continually spread out from the fill level shown in FIG. 5 toward the connecting section 28 so that the glue 24 completely and uniformly wets the opposing walls of the first and second sheet metal layers 20, 22 and then, for example in pass 50 number 4, travels into the sickle-shaped end sections of the hollow chamber 30. The degree to which the glue 24 rises during the final pass 50 for shaping the sheet metal profile support 10 is determined by the initial fill level, which is indicate by way of example in pass 50 number 7 in FIG. 5. After the shaping is completed, the longitudinal edges 38, 40 of the sheet are permanently bonded to each other, for example welded, along the butt seam 42 (FIG. 2).

The shaping of the sheet 36 or sheet metal band into a double-walled sheet metal profile support 10 takes place over a number of succeeding rolling steps or passes 50.

Reference Numeral List
10—sheet metal profile support
12—profile cross section
14—section
16—leg
18—leg
20—first sheet metal layer
22—second sheet metal layer
24—glue
26—glue layer
28—connecting section 30—hollow chamber
32—beaded edge
34—hollow chamber
36—sheet
38—longitudinal edge of the sheet
40—longitudinal edge of the sheet
42—butt seam
44—central region
46—edge region
48—V-shape
50—pass

What is claimed is:

1. A sheet metal profile support (10) for automotive construction with an essentially U-shaped, parabolic, or horseshoe-shaped profile cross section (12), in which, in at least one section (14) of the two legs (16, 18) the profile, a first and second sheet metal layer (20, 22) rest essentially flush against each other as a sheet doubling and in the region of the free ends of the legs (16, 18), the sheet metal layers (20, 22) are connected to each other in one piece by means of a beaded edge (32) that has a hollow chamber (34), characterized in that the hollow amber (34) of the beaded edge (32) in the region of the free ends of the legs (16, 18) is filled with glue (24) and that the glue (24) is introduced between the sheet metal layers (20, 22), at least in the section (14) of the flush-contacting sheet doubling in the region of the legs of the profile, and the sheet metal layers (20, 22) are bonded to each other by the glue (24).

2. The sheet metal profile support according to claim 1, characterized in that a curved or arc-shaped connecting section (28) of the two legs (16, 18) is constituted by the first and second sheet metal layers (20, 22), which form a hollow chamber (30).

3. The sheet metal profile support according to claim 2, characterized in that the hollow chamber (30) has an essentially sickle-shaped cross sectional profile.

4. The sheet metal profile support according to claim 1, characterized in that the hollow chamber (34) has an essentially teardrop-shaped cross sectional profile.

5. The sheet metal profile support according to claim 1, characterized in that the sheet metal profile support (10) is formed out of a one-piece sheet (36) or sheet metal band and the longitudinal edges (38, 40) of the sheet are bonded to each other along a butt seam (42) extending in the direction of the longitudinal axis of the sheet metal profile support (10).

6. The sheet metal profile support according to claim 5, characterized in that the butt seam is disposed in a central section of a sheet metal layer (20, 22) of the connecting section (28) of the two legs (16, 18).

7. The sheet metal profile support according to claim 1, characterized in that the glue (24) forms a glue layer (26) that essentially covers the entire area between the contacting sheet metal layers (20, 22) of the legs (16, 18).

8. The sheet metal profile support according to claim 1, characterized in that the glue (24) is disposed at least in sections of the hollow chamber (30) of the connecting section (28) in the region of the ends of the sickle-shaped cross sectional profile pointing toward the legs (16, 18).

9. A method for producing a sheet metal profile support (10) in which a central region (44) of an essentially flat sheet (36) or sheet metal band is shaped into a first sheet metal layer (20) with an essentially U-shaped, parabolic, or horseshoe-shaped profile cross section (12), and then the edge regions (46) of the sheet (36) are shaped into a second sheet metal layer (22) with an essentially U-shaped parabolic, or horseshoe-shaped profile cross section (12), and after the shaping is completed, the second sheet metal layer (22) encompasses or embraces the first sheet metal layer (20), characterized in that during the shaping, glue (24) is introduced between the first and second sheet metal layers (20, 22) at a time when these sheet metal layers (20, 22), in the section (14) that will form the flush sheet doubling later in the shaping process, are disposed approximately in a V-shape (48) in relation to each other.

10. The method according to claim 9, characterized in that during the shaping, the glue (24) is introduced into a beaded edge (32) at the free end of the legs (16, 18) of the sheet metal profile support (10).

11. The method according to claim 9, characterized in that such a volume or such a fill level of glue (24) is introduced between the first and second sheet metal layers (20, 22), preferably in the region of the beaded edge (32), that as a result of the subsequent shaping of the second sheet metal layer (22) into flush contact with the first sheet metal layer (20), the glue (24) is pushed or pressed between the first and second sheet metal layers (20, 22), at least in a section (14) of the two legs (16, 18), into the connecting section (28) of the legs (16, 18).

12. The method according to claim 9, characterized in that the glue (24) forms a glue layer (26) that covers essentially the entire area in the section (14) between the sheet metal layers (20, 22) that rest essentially flush against each other.

13. The method according to claim 9, characterized in that when the shaping is completed, the longitudinal edges (38, 40) of the sheet are bonded, for example welded, along the butt seam (42).

14. The method according to claim 9, characterized in that the shaping of the sheet (36) or sheet metal band into a double-walled sheet metal profile support occurs over a number of succeeding rolling steps or passes.

15. The sheet metal profile support according to claim 1, characterized in that said chamber (34) is completely filled with glue (24).

16. The sheet metal profile support according to claim 1, characterized in that said sheet metal layers (20, 22) are bonded to each other by a glue layer (26).

17. The sheet metal profile support according to claim 1, characterized in that said sheet metal profile support is a cross member, a rocker panel or a frame support.

* * * * *

UNITED STATES PATENT AND TRADEMARK OFFICE
CERTIFICATE OF CORRECTION

PATENT NO. : 6,790,536 B2
DATED : September 14, 2004
INVENTOR(S) : Gerhard Schonleber and Alexander Dollischek It is certified that error appears in the above-identified patent and that said Letters Patent is hereby corrected as shown below:

Column 7,
Line 16, before "the profile" insert -- of --.
Line 22, change "amber" to -- chamber --.

Signed and Sealed this

Eighth Day of February, 2005

JON W. DUDAS
*Director of the United States Patent and Trademark Office*